United States Patent [19]

Moore et al.

[11] 4,106,845
[45] Aug. 15, 1978

[54] INFRA-RED SCANNER

[75] Inventors: William Thomas Moore, London; George Heftman, Pinner, both of England

[73] Assignee: The Rank Organisation Limited, London, England

[21] Appl. No.: 714,492

[22] Filed: Aug. 16, 1976

[51] Int. Cl.² .................................. G02B 27/17
[52] U.S. Cl. .............................. 350/6.6; 350/6.8; 358/199
[58] Field of Search ......... 350/6, 294, 7, 81, 285–287, 350/26, 27, 175 TS, 199, 212; 250/235, 236; 356/167, 203; 358/199

[56] References Cited

U.S. PATENT DOCUMENTS

| 2,787,701 | 4/1957 | Rosin | 350/294 |
| 3,565,511 | 2/1972 | Dilworth | 350/175 TS |
| 3,721,488 | 3/1973 | Kuhue | 350/212 |
| 3,817,593 | 6/1974 | Harris et al. | 350/6 |
| 3,887,263 | 6/1975 | Thompson | 350/7 |
| 3,956,586 | 5/1976 | Ullstig | 250/236 |
| 3,973,825 | 8/1976 | Starkweather | 350/6 |

FOREIGN PATENT DOCUMENTS 1,260,923  1/1972  United Kingdom .............. 350/175 TS

*Primary Examiner*—John K. Corbin
*Assistant Examiner*—B. W. de los Reyes
*Attorney, Agent, or Firm*—Brisebois & Kruger

[57] ABSTRACT

In a high speed optical scanning system using mechanical scanning by a rotating polygon, an afocal telescope system images radiation on to the rotating polygon which effects line scanning. Frame scanning is effected by an angularly reciprocating mirror.

12 Claims, 4 Drawing Figures

INFRA-RED SCANNER

This invention relates to optical scanning systems, with particular, but not exclusive, reference to infra-red scanning.

It is known to use mechanical scanning systems to direct light onto a radiation detector or array of detectors from successive regions of a scene being viewed, that is, in effect to scan the scene by means of the detector. Such scanning is commonly effected in a succession of parallel lines forming a "picture" or "frame", each frame being made up of a given number of lines and each frame scan being repeated at intervals to provide a substantially continuous scan of the scene.

A problem associated with mechanical scanning systesm of the kind used for infra-red radiation, as compared with the electronic scanning system used in the visible region of the spectrum, for example in television cameras, is that extremely high rotational speeds of the mechanical parts are necessary to achieve an acceptable scanning rate. For example, a "picture" made up of 240 lines (substantially less than the number of lines in a television picture) scanned at 25 frames per second requires a line scanning rate of 6000 lines per second. To achieve such a scanning rate mechanically it is common to employ a transverse array of detectors which scan a "band" made up of a number of lines, rather than individual lines, enabling a "banded" picture to be built up. A practical limitation to this approach is that of the matching the adjoining scanned bands of the "picture" and of matching the individual detectors in the detector array. For this reason consideration has been given to effective high speed mechanical scanning systems capable of scanning individual lines at an acceptable rate, and it is with such scanning systems that the present invention is concerned.

According to the present invention there is provided an optical scanning system in which successive line scans of a scene are made by a radiation detector which receives radiation reflected from successive faces of a rotating polygon, the radiation from the scene being directed onto each successive face of the polygon in a substantially parallel beam by an afocal optical system which eliminates optical field curvature.

The use of a rotating polygon to effect mechanical scanning is of course, well known. The greater the number of faces on the polygon, the greater the line scanning rate which can be achieved. In practice, however, a large number of polygon faces entails a polygon of large diameter which in turn sets a limit on the rotational speed of the polygon. To enable the polygon to rotate at high speed it is preferably made from a single piece of material, for example by machining.

The afocal optical system, as well as eliminating optical field curvature, also substantially eliminates the "pupil scan" which otherwise would occur where a lens system is used to attain a narrow angle of view at the polygon.

Preferably the afocal optical system comprises a telescope operating at effectively infinite image distance. The telescope may have a front lens and a rear lens which images the effective aperture of the front lens onto each successive face of the polygon. Preferably both lenses are aspheric and are optimised for flat field.

Alternatively, the afocal optical system may comprise a reflective telescope which may be corrected both for field curvature and astigmatism. Such reflecting telescope may include a first concave mirror which directs the incident radiation into a second, narrower aperture mirror which in turn directs the radiation in a beam through a central aperture in the first mirror onto each successive face of the rotating polygon. The second mirror may be flat, convex, concave or a Mangin type mirror associated with a correcting lens element. A lens element may be provided to direct the radiation reflected from the second mirror onto the polygon in a substantially parallel beam: this lens element may conveniently be located in the central aperture of the first mirror. A lens or correcting plate may be disposed in the path of the radiation incident on the first mirror from the scene being scanned. At least three of the surfaces in the optical system of the reflecting telescope should be aspheric to achieve the desired aberration correction.

Since the present invention employs a polygon having a relatively small number of faces is capable of rotating at high speed the "frame" scanning of the scene cannot in practice be effected by a progressive "angling" of successive faces of the polygon with respect to an axis perpendicular to the axis of rotation of the polygon. According therefore to the present invention the "frame" scan of slower speeds than the line scan effected by the polygon, and transverse to the direction of the line scan, is effected by a mirror which makes rotational oscillations about an axis perpendicular to the axis of rotation of the polygon, and including a relay optical system which directs radiation reflected by the successive faces of the polygon onto the oscillating mirror, and thence onto the detector, without introducing any substantial aberrations.

The relay optical system may include a concave imaging mirror arranged with its centre of curvature substantially coincident with the centre of the each polygon face when the latter is reflecting radiation into the mirror at the centre of a line scan, and a beam deflecting mirror arranged substantially at the focal plane of the imaging mirror, with an elongation parallel to the axis of rotation of the polygon, for directing the radiation beam reflected by the imaging mirror onto the oscillating mirror, which is positioned at substantially the same optical path length from the imaging mirror as the said polygon face. A lens may be arranged to image the radiation beam reflected by the oscillating mirror onto the detector.

The invention will now be described, by way of example, with reference to the accompanying purely schematic drawings in which.

Figure 1:
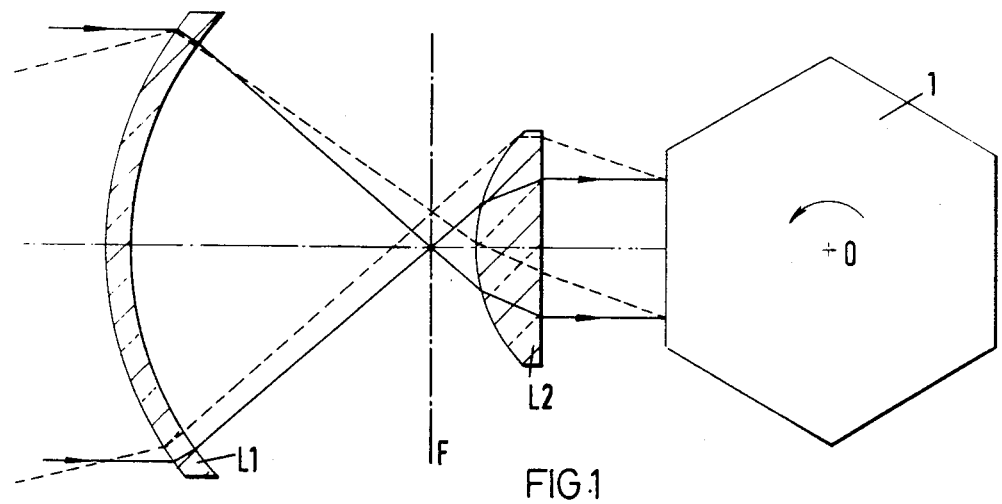
FIG. 1 is a diagrammatic representation of an optical telescope system associated with a rotating polygon, in an optical scanning system according to one embodiment of the invention.

Referring to FIG. 1 a rotating polygon 1 in this example a hexagon, is shown, mounted for rotation about its longitudinal axis 0, for effecting line scanning of a scene as "viewed" by the detector (not shown) in infra-red radiation. The radiation from the scene is directed onto a face of the polygon 1 by an afocal telescope system comprising, in the embodiment of FIG. 1, a front lens L1 and a rear lens L2. The rear lens L2 images the diameter of the front objective lens L1 onto the polygon face so that the "pupil scan" problem, that is, the movement of the illuminated "patch" on the face of the polygon in the opposite direction to the direction of rotation of the polygon, is effectively eliminated. Both the lenses L1 and L2 are aspheric, the combination being optimized to achieve either a flat field at the polygon face or zero astigmatism. In practice the combination would be optimized to provide a substantially flat field at the polygon face, since this results in this minimum picture aberration.

In FIG. 1 the internal focal plane of the lens system is designated by the chain-dotted line F, and the radiation path from an off-axis object point is shown in broken lines.

Figure 2:
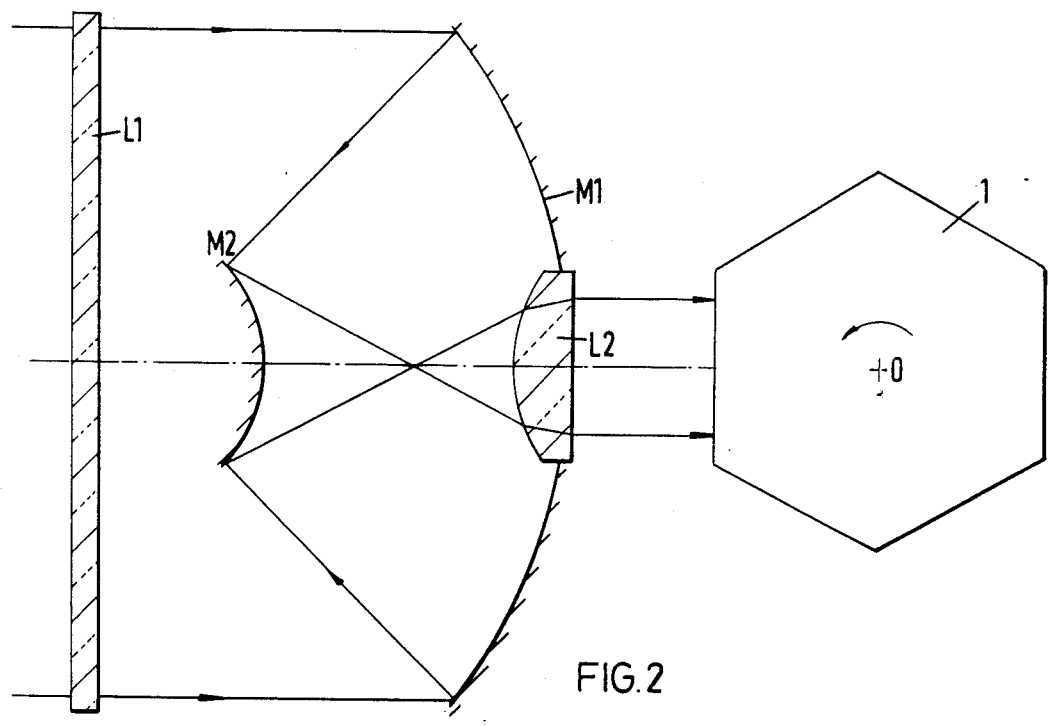
FIG. 2 is a ray diagram illustrating a reflecting aspheric optical system associated with a rotating polygon in an alternative optical scanning system according to the invention.

In order to correct for both field curvature and astigmatism a reflecting light gathering system should be employed, as illustrated in FIG. 2. The incident radiation is collected by a first wide aperture concave mirror M1 which directs the radiation into a second narrower aperture mirror M2 which may be flat, convex, concave, or in the form of a mangin type mirror with an associated correcting lens element. The mirror M2 reflects the radiation through a central aperture in the mirror M1, a lens L2 being located in this aperture to produce a substantially parallel beam which is directed onto each successive face of the rotating polygon 1. In the reflecting system shown in FIG. 2 three of the optical surfaces should be aspheric in order to achieve the requisite aberration correction. A correcting plate or lens L1 may be provided as a further aberration correcting element.

In effect the telescope optical systems illustrated in FIGS. 1 and 2 demagnify the scan of the polygon, matching a system pupil which is effectively at the polygon face.

Figure 3:
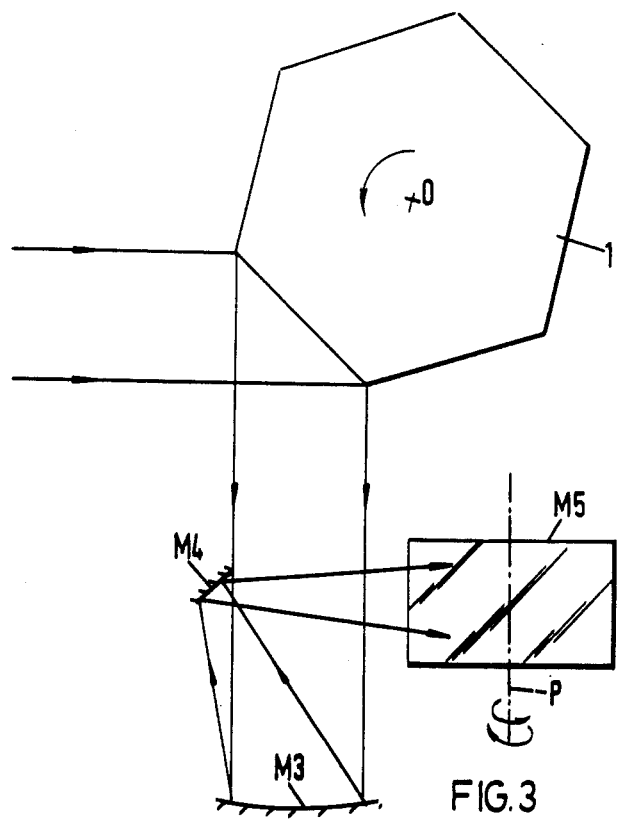
FIG. 3 illustrates one form of relay optical system associated with the rotating polygon in the embodiment of FIG. 1 or FIG. 2, in order to produce frame scanning.
Figure 4:
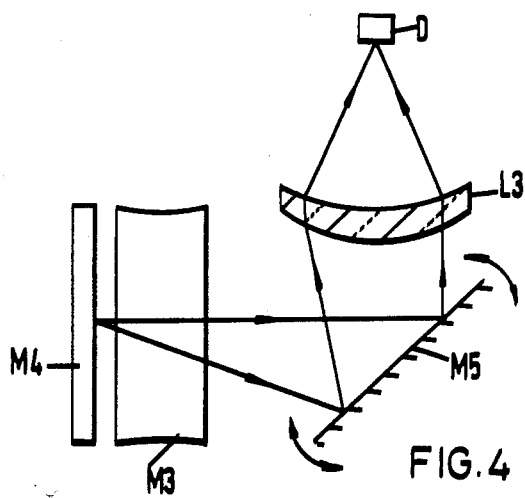
FIG. 4 is a diagrammatic view of the relay optical system shown in FIG. 3, viewed from the direction of arrow IV, with the rotating polygon removed.

The rotating polygon 1 shown in FIGS. 1 and 2 provide scanning of the incident radiation in one direction only, namely the line scanning direction. To build up a picture with each complete scan of the detector or detector array a frame scan is required, at a slower speed, transverse to the direction of line scanning. To effect such frame scanning a flat frame scan mirror is provided which makes rotational oscillations about an axis perpendicular to the axis of rotation of the polygon 1. After reflection at each successive face of the rotating polygon the radiation is directed onto the reciprocating mirror by a relay optical system which is such that it does not introduce aberrations. One form of such system is illustrated in FIGS. 3 and 4. The system includes a concave imaging mirror M3 which is located with its centre of curvature at the centre of the reflecting face of the polygon when the latter is at the centre of a given line scan. A beam deflecting flat mirror M4 is located at the focal plane of the concave mirror M3, that is, one half the radius of the mirror M3 from the surface of the latter, with its length parallel to the axis of rotation 0 of the polygon 1. The mirror M4 reflects radiation onto the reciprocating mirror M5, the axis of rotational oscillation of which is indicated by P in FIG. 3. The radiation reflected by the oscillating mirror M5 is gathered by a lens L3 and imaged onto a detector or detector array D.

The oscillation speed of the mirror M5 is related to the rotational speed of the polygon 1 so that the combined oscillation of the mirror M5 and rotation of the polygon 1 causes the detector to "see" successive areas of the scanned scene in a succession of line scans each occupying a "frame" so that a "picture" is formed by the successive frames. The speed of frame scanning will be determined by the rate of oscillation of the mirror M5 and the speed of line scanning by the rate of rotation of the polygon 1.

It is arranged that the optical path length between the concave mirror M3 and the oscillating mirror M5 is substantially the same as that between the mirror M3 and the reflecting face of the polygon 1 — that is, the distance M4-M5 is equal to one half of the radius of the concave mirror M3. In this way first order optical aberrations are eliminated, since the effective pupil is at the centre of curvature of the mirror M3, which therefore produces no coma or astigmatism. The mirror M3 does, however, produce field curvature, but this is compensated by the reciprocating mirror M5. Any residual spherical aberration in the reflecting system can be corrected either by suitable asphericity of a surface in the associated telescope of FIG. 1 or FIG. 2, or by asphericity of the lens L3.

The F/number of the detector system is given by the angle of convergence of the radiation beam directed onto the detector D by the lens L3.

It will be noted that since the surface of the polygon is imaged by the concave mirror M3 onto the reciprocating mirror M5 the mirror M5 is also located at an effective system pupil. Thus no pupil scan occurs at the reciprocating mirror M5 or at the detector D.

What we claim is:

1. An optical scanning system for making successive line scans of a scene, comprising in combination:
    a radiation detector,
    a regular rotary polygon having flat external reflective faces,
    an afocal optical system substantially free of optical field curvature for directing radiation from a scene to be scanned in a substantially parallel beam onto each successive face of the rotary polygon,
    a flat frame scanning mirror arranged for rotational oscillations about an axis perpendicular to the axis of rotation of the polygon to effect a frame scan of slower speed than the line scan effected by the rotary polygon, and
    a relay optical system interposed between the rotary polygon and the frame scanning mirror, the relay optical system comprising:
    a. a concave imaging mirror arranged with its centre of curvature substantially coincident with the centre of each polygon face when the latter is reflecting radiation into the mirror at the centre of a line scan, and
    b. a beam deflecting mirror arranged substantially at the focal plane of said concave mirror, with an elongation parallel to the axis of rotation of the polygon, for directing the radiation beam reflected by the imaging mirror onto the frame scanning mirror, the latter being positioned at substantially the same optical path length from said imaging mirror as said polygon face.

2. A scanning system according to claim 1, in which the afocal optical system comprises a telescope operating at effectively infinite object distance.

3. A scanning system according to claim 2, in which the telescope has a front lens and a rear lens which images the effective aperture of the front lens onto each successive face of the polygon.

4. A scanning system according to claim 3, in which both lenses are aspheric and optimised for either flat field or zero astigmatism.

5. A scanning system according to claim 1, in which the afocal optical system comprises a reflecting telescope corrected for field curvature and astigmatism.

6. A scanning system according to claim 5, in which the reflecting telescope includes a first concave mirror which directs the incident radiation into a second, narrower aperture mirror which in turn directs the radiation in a beam through a central aperture in the first mirror onto each successive face of the rotating polygon.

7. A scanning system according to claim 6, including a lens element which directs the radiation reflected from the second mirror onto the polygon in a substantially parallel beam.

8. A scanning system according to claim 6, in which a correcting element is disposed in the path of the radiation incident on the first mirror from the scene being scanned.

9. A scanning system according to claim 6, in which the second mirror is selected from the group comprising a flat mirror, a convex mirror, a concave mirror, and a Mangin type mirror associated with a correcting lens element.

10. A scanning system according to claim 1, including a lens arranged to image the radiation beam reflected by the frame scanning mirror onto the detector.

11. A scanning system according to claim 1, in which the rotating polygon is made from a single piece of material.

12. A scanning system according to claim 11, in which at least three surfaces in the optical system are aspheric.

* * * * *